US012639605B2

(12) United States Patent
Griffin et al.

(10) Patent No.: US 12,639,605 B2
(45) Date of Patent: May 26, 2026

(54) DECOMPOSING QUANTUM SOURCE CODE FILES INTO QUANTUM CODE SNIPPETS

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 752 days.

(21) Appl. No.: 18/072,176

(22) Filed: Nov. 30, 2022

(65) Prior Publication Data

US 2024/0177037 A1     May 30, 2024

(51) Int. Cl.
G06F 8/41          (2018.01)
G06N 10/20        (2022.01)

(52) U.S. Cl.
CPC .................................. G06N 10/20 (2022.01)

(58) Field of Classification Search
CPC ........................................................ G06F 8/41
See application file for complete search history.

(56) References Cited

U.S. PATENT DOCUMENTS

| | | | | |
|---|---|---|---|---|
| 10,223,084 | B1 * | 3/2019 | Dunn | G06F 8/41 |
| 10,698,789 | B1 | 6/2020 | Liu et al. | |
| 11,243,248 | B2 | 2/2022 | Liu et al. | |
| 11,797,276 | B1 * | 10/2023 | Shi | G06N 10/00 |

| | | | | |
|---|---|---|---|---|
| 2007/0283098 | A1 * | 12/2007 | O'Brien | G06F 9/30047 |
| | | | | 711/E12.051 |
| 2013/0326489 | A1 * | 12/2013 | Eijndhoven | G06F 8/41 |
| | | | | 717/139 |
| 2020/0074346 | A1 | 3/2020 | Griffin et al. | |
| 2021/0173660 | A1 | 6/2021 | Hogaboam et al. | |
| 2021/0182724 | A1 | 6/2021 | Zou et al. | |
| 2021/0286601 | A1 * | 9/2021 | Fitzsimons | G06F 8/72 |
| 2021/0334081 | A1 | 10/2021 | Chong et al. | |
| 2021/0350265 | A1 * | 11/2021 | Jung | G06N 10/70 |
| 2022/0374239 | A1 * | 11/2022 | Freedman | G06N 10/00 |

FOREIGN PATENT DOCUMENTS

| | | | | | |
|---|---|---|---|---|---|
| CN | 110179450 | A | * | 8/2019 | A61B 5/245 |
| CN | 111079933 | B | * | 4/2023 | G06N 10/00 |

OTHER PUBLICATIONS

Smith, Robert S., et al., "A Practical Quantum Instruction Set Architecture," arXiv:1608.03355v2 [quant-ph], 2016, 15 pages.
Svore, Krysta Marie, et al., "A layered software architecture for quantum computing design tools," https://www.researchgate.net/publication/2956450, IEEE Computer Society, 39, 74-83, 10.1109/MC.2006.4, Feb. 2006, 11 pages.

* cited by examiner

*Primary Examiner* — Jae U Jeon

(74) *Attorney, Agent, or Firm* — Dority & Manning, P.A.

(57)          ABSTRACT

A quantum source code file is received. One or more portions of the quantum source code file to be decomposed into at least one quantum code snippet are identified. The one or more portions of the quantum source code file are validated as independently compilable. The at least one quantum code snippet is generated.

20 Claims, 6 Drawing Sheets

300

START

RECEIVE A COMMAND TO EXECUTE A SECTION OF THE QUANTUM SOURCE CODE FILE ~ 302

SELECT A SELECTED QUANTUM CODE SNIPPET BASED ON A START INSTRUCTION AND AN END INSTRUCTION ~ 304

EXECUTE THE SELECTED QUANTUM CODE SNIPPET TO GENERATE A PROGRAM STATE OF A QUANTUM COMPUTING DEVICE ~ 306

RECORD THE PROGRAM STATE OF THE QUANTUM COMPUTING DEVICE ~ 308

END

200

START

RECEIVE A QUANTUM SOURCE CODE FILE — 202

IDENTIFY ONE OR MORE PORTIONS OF THE QUANTUM SOURCE CODE FILE TO BE DECOMPOSED INTO AT LEAST ONE QUANTUM CODE SNIPPET — 204

VALIDATE THE ONE OR MORE PORTIONS OF THE QUANTUM SOURCE CODE FILE AS INDEPENDENTLY COMPILABLE — 206

GENERATE THE AT LEAST ONE QUANTUM CODE SNIPPET — 208

END

300

START

RECEIVE A COMMAND TO EXECUTE A SECTION OF THE QUANTUM SOURCE CODE FILE — 302

SELECT A SELECTED QUANTUM CODE SNIPPET BASED ON A START INSTRUCTION AND AN END INSTRUCTION — 304

EXECUTE THE SELECTED QUANTUM CODE SNIPPET TO GENERATE A PROGRAM STATE OF A QUANTUM COMPUTING DEVICE — 306

RECORD THE PROGRAM STATE OF THE QUANTUM COMPUTING DEVICE — 308

END

DECOMPOSING QUANTUM SOURCE CODE FILES INTO QUANTUM CODE SNIPPETS

BACKGROUND

Quantum computing involves the use of quantum bits, referred to herein as "qubits," which have characteristics that differ from those of classical (e.g., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit may not be described independently of the state of the other qubit.

SUMMARY

The examples disclosed herein relate to decomposing quantum source code files into quantum code snippets. In one example, a method may include receiving a quantum source code file. The method may include identifying one or more portions of the quantum source code file to be decomposed into at least one quantum code snippet. The method may include validating the one or more portions of the quantum source code file as independently compilable. The method may include generating the at least one quantum code snippet.

In another example, a quantum computing device includes a memory. The quantum computing device includes a quantum processor device coupled to the memory. The quantum processor device is to receive a quantum source code file. The quantum processor device is to identify one or more portions of the quantum source code file to be decomposed into at least one quantum code snippet. The quantum processor device is to validate the one or more portions of the quantum source code file as independently compilable. The quantum processor device is to generate the at least one quantum code snippet.

In another example, a non-transitory computer-readable storage medium incudes instructions to cause one or more processor devices to perform operations. The operations may include receiving a quantum source code file. The operations may include identifying one or more portions of the quantum source code file to be decomposed into at least one quantum code snippet. The operations may include validating the one or more portions of the quantum source code file as independently compilable. The operations may include generating the at least one quantum code snippet.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
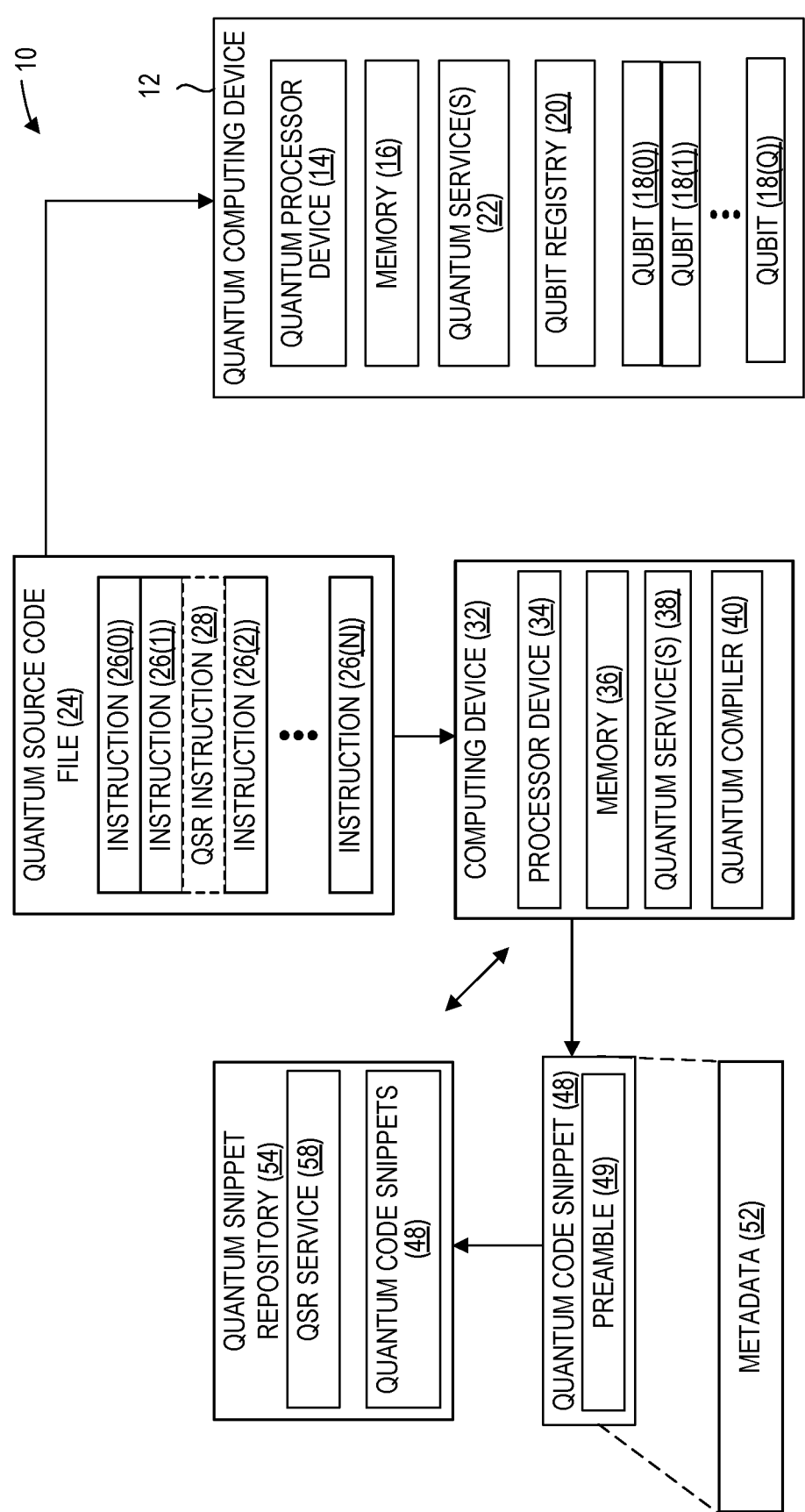
FIG. 1 depicts a computing system according to examples of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Finally, it is noted that while, for purposes of illustration and simplicity, examples are illustrated as being implemented by computer system that comprises a single computing device that in turn comprises a single processor device, in practice the examples/embodiments disclosed herein may be implemented in a computer system that comprises any number of computing devices, each of which may comprise one or more processor devices. Thus, irrespective of the implementation, the examples/embodiments may be implemented on a computer system that includes one or more computing devices, wherein the one or more computing devices comprise one or more processor devices, and the one or more processor devices are configured to implement functionality disclosed herein.

Quantum computing devices may execute a plurality of different quantum services by performing operations using one or more qubits. Each quantum service may be associated with a quantum source code file, such as a quantum assembly File ("QASM file") as a non-limiting example. The quantum source code file may include one or more instructions that define operations for executing the quantum service. Qubits may have to be placed into certain physical configurations associated with qubit physical properties, such as certain positions, certain polarities, and other physical configurations. In addition, certain quantum services may require certain qubits of a certain physical qubit type or may require a specific qubit environment. Instructions directed to setup and/or physical configuration of qubits to perform the quantum service may require in-depth knowledge of the nuances of physical manipulation of qubits. Errors and inefficiencies may result from improper instructions, inefficient qubit manipulations, and/or improper sequential order.

It can be desirable for programmers to standardize, share, and reference common quantum code. Furthermore, it can be desirable to observe a program state of quantum computing devices during execution of the quantum source code file. In classical (e.g., binary) programming, it is generally possible for a programmer to "step" through a program's execution line-by-line with a tool such as a debugger. However, this functionality is generally unavailable for quantum programs, which rely on probabilistic operations, qubit manipulations, and other complex operations which may not be easily amenable to classical debugging techniques.

Examples of the present disclosure are directed to decomposing quantum source code files into quantum code snippets for use in quantum programming. More specifically, a computing device may decompose a quantum source code file into one or more quantum code snippets that are independently compilable sections of the quantum source code file. In some cases, additional code (e.g., boilerplate code) may be added to the quantum code snippets to facilitate completeness and compilability. The quantum code snippets may be stored in a quantum snippet repository or other centralized store such that the snippets may be incorporated into quantum computing environments at a plurality of computing systems.

In another example, quantum code snippets may be generated for sequentially increasing sections of a quantum source code file. The quantum code snippets may be executed (e.g., by a quantum computing device) in order of increasing progress through the quantum source code file. A program state of the quantum computing device after executing each snippet may be stored and/or provided to a developer. Thus, the developer can "step through" the quantum source code file by sequentially executing quantum code snippets.

Aspects of the present disclosure provide a number of technical effects and benefits. For instance, example aspects of the present disclosure provide for a computing system to generate quantum code snippets from a larger quantum source code file. The increased availability of quantum code snippets as described herein can lead to reduced errors in setup and/or physical manipulation of qubits during execution of a quantum service, especially over multiple quantum services and/or multiple development instances, by providing for developers to share and/or standardize sections of quantum code. In addition, the use of quantum code snippets for debugging as described herein can provide an improved understanding of the program state of a quantum computing device during intermediate steps of a larger quantum algorithm, which can provide for developers to isolate and resolve errors or bugs in programs and improve overall function of the quantum algorithm. Further still, the use of quantum code snippets can reduce a number of computing resources needed to store quantum source code files as well as reduce possible occurrences of conflicting or outdated versions of quantum source code files by facilitating standardization of code.

FIG. 1 is a block diagram of a system 10 in which examples may be practiced. The system 10 includes a quantum computing device 12. The quantum computing device 12 may include one or more processor device(s) 14 (e.g., quantum processor device(s)) and one or more memory device(s) 16. The quantum computing device 12 operates in quantum environments but is capable of operating using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In FIG. 1, the quantum computing device 12 may use qubits 18(0) . . . 18(Q), each of which has properties that differ from those of classical (i.e., non-quantum) bits used in classical computing. A qubit 18(0) . . . 18(Q) may encode quantum information for an underlying particle such as an atom or a photon and may possess characteristics that differ from those of classical (i.e., non-quantum) bits used in classical computing. For example, while a classical bit may be in a state of either one (1) or zero (0), each qubit 18(0) . . . 18(Q) may be in a "superposition" of both states simultaneously. The qubits 18(0) . . . 18(Q) may also experience a physical phenomenon referred to as "entanglement," in which the quantum state of each qubit 18(0) . . . 18(Q) may not be described independently of the state of another qubit. One application for the phenomenon of entanglement is quantum "teleportation" of a qubit. As used herein, teleportation refers to a process in which an entangled pair of qubits may be used to transmit quantum state information for a payload qubit (e.g., a qubit to be teleported) from one location to another, without having to transmit the payload qubit's underlying particle.

To maintain information for the qubits 18(0) . . . 18(Q), the quantum computing device 12 may include a qubit registry 20. The qubit registry 20 may include a plurality of qubit registry entries each corresponding to a qubit, such as one of qubits 18(0) . . . 18(Q). The qubit registry 20 maintains and provides access to data relating to the qubits 18(0) . . . 18(Q) implemented by the quantum computing device 12, such as a count of the total number of qubits implemented by the quantum computing device 12 and a count of the number of available qubits that are currently available for allocation ("qubit resource allocation"), as non-limiting examples. Each of the entries of the qubit registry 20 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state. Details concerning an example of the quantum computing device 12 will be set forth with respect to FIG. 6.

The quantum computing device 12 of FIG. 1 may execute one or more quantum services 22. A quantum service 22 is a process that employs qubits such as the one or more qubits 18(0)-18(Q) to provide desired functionality. Each of the one or more quantum service(s) 22 may be associated with a series of process operations implemented by the quantum computing device 12. The process operations may identify qubits, configure qubits in a qubit physical configuration, instantiate qubits, place them into specific quantum states and relationships, store values using the qubits, and/or subsequently deallocate and reuse the qubits to return a result for the one or more quantum service(s) 22.

FIG. 1 depicts a single quantum service 22 for purposes of illustration and discussion. Those of ordinary skill in the art, using the disclosures provided herein will understand that the quantum computing device 12 may implement tens, hundreds or even thousands of quantum services.

The system 10 may include a computing device 32. The computing device 32 may be a classical computing device or a quantum computing device. The computing device 32 may have a processor device 34 and a memory 36. The computing device 32 may also implement one or more quantum service(s) 22. In implementations where the computing device 32 is a quantum computing device, the quantum service(s) 22 may be implemented using one or more qubits (not shown). In implementations where the computing device 32 is a classical computing device, the computing device 32 may perform a classical simulation of quantum operations to implement the quantum service(s) 22. Details concerning an example computing device 32 implemented using classical computing are discussed with reference to FIG. 5.

The quantum service 22 may be defined by a quantum source code file, such as quantum source code file 24. The quantum source code file 24 may comprise a Quantum Assembly File (QASM) file, as a non-limiting example. The quantum source code file 24 may have a plurality of quantum programming instructions 26(0) . . . 26(n) (referred to herein as "instructions" and captioned as "INSTRUCTION" in FIG. 1) for allocating and manipulating qubits to achieve a desired functionality associated with the quantum service. The quantum source code file 24 may include one or more QSR instructions that reference a quantum code snippet 48 and instruct a compiler (e.g., quantum compiler 40) to include the respective quantum code snippet 48 in the quantum source code file 24.

According to example aspects of the present disclosure, the quantum source code file 24 may be decomposed into one or more quantum code snippets 48. In particular, the computing device 32 can receive the quantum source code file 24. Additionally and/or alternatively, the computing device 32 can receive a request (e.g., from a user of computing device 32) to decompose the quantum source code file 24 into quantum code snippets 48. Additionally, in some cases, a preamble 49 may be incorporated into the quantum code snippet 48 such that the snippet 48 is independently compilable.

The quantum compiler 40 can produce a compiled quantum algorithm (e.g., an executable algorithm) in response to receiving the quantum source code file. 24 In addition and/or alternatively, the quantum compiler 40 can produce errors in the event that the quantum source code file 24 does not compile correctly. The errors may generally be descriptive of where and/or what type of problem exists in the quantum source code file 24.

The computing device 32 can provide the quantum code snippet(s) 48 to a quantum snippet repository (QSR) 54. The quantum code snippets may be transferred to and/or stored in the quantum snippet repository 54. The quantum snippet repository 54 can be accessible by one or more additional computing devices. For instance, the quantum snippet repository 54 can communicate with computing device 32 and/or other computing devices (not illustrated).

Referring to FIG. 1, because the QSR 54 is a component of the computing device 32, functionality implemented by the QSR 54 may be attributed to the computing device 32 generally. Moreover, in examples where the QSR 54 comprises software instructions that program the computing device 32 to carry out functionality discussed herein, functionality implemented by the QSR 54 may be attributed herein to the processor device 34.

It is further noted that while the QSR 54 is shown as a single component, in other implementations, the QSR 54 may be implemented in a plurality of components. Finally, it is noted that while, for purposes of illustration and simplicity, the examples are illustrated as being implemented by a single processor device on a single computing device, in other environments, such as a distributed and/or clustered environment, and where the QSR 54 is implemented in multiple components, the QSR 54 may be implemented on a computer system that includes a plurality of processor devices of a plurality of different computing devices. Thus, irrespective of the implementation, the examples may be implemented on a computer system that includes one or more processor devices of one or more computing devices.

In addition, the QSR 54 is shown in FIG. 1 as being implemented by a computing device 32 that is separate from the quantum computing device 12. However, those of ordinary skill in the art, using the disclosures provided herein, will understand that the QSR 54 may be implemented by the quantum computing device 12 without deviating from the scope of the present disclosure.

The QSR 54 may generate and/or assign metadata 52 to the quantum code snippet(s) 48. In some examples, the metadata 52 may be searchable metadata. The metadata 52 may include data sufficient to identify quantum code snippet (s) 48 and/or its functionality. The metadata 52 may include data such as a QLSF identifier, a version number, description of functionality, description of physical properties, or other metadata. For instance, the QSR service 58 may provide for a user to search for quantum code snippet(s) 48 by metadata 52.

The QSR 54 may store the quantum code snippet(s) 48, including the metadata 52 in a database. The database may be implemented, for instance, in memory, such as memory 36 of computing device 32, memory device(s) 16 of quantum computing device 12, or memory of one or more other classical or quantum computing devices accessible by QSR 54 over a communication network (e.g., a wired or wireless communication network). The database may store a plurality of quantum code snippet(s) 48, such as all quantum code snippet(s) 48 generated by the system 10. The database may be a searchable database that allows services (e.g., quantum services 22, 38, QSR service 58) and/or users to perform search queries to locate quantum code snippets 48 responsive to the queries and return the quantum code snippets 48 and/or data associated with the snippets 48 (e.g., metadata 52) in response to the search queries.

For instance, in some examples, the QSR 54 may implement a QSR service 58. The QSR service 58 may have functionality to receive search queries from other services (e.g., quantum services 22, 38) via an application programming interface and/or from users (e.g., via a suitable user interface). The QSR service 58 may be implemented by one or more processor devices. For instance, the QSR service 58 may be implemented by a processor device associated with the QSR 54, by processor device 34 of computing device 32, by quantum processor device 14 of the quantum computing device 12, or by one or more other classical or quantum processor devices accessible by components of the system 10 over a communication network.

In some examples, a user may interact with the QSR service 58 via, for instance, a suitable user interface. The user may provide a query (e.g., natural language query or other query) to the QSR service 58. The QSR service 58 may process the query and identify one or more selected quantum code snippet(s) responsive to the query. The code snippet(s) may be identified based at least in part on the metadata 52 associated with code snippet(s). For instance, the metadata 52 associated with the code snippet(s) may "match" or may be a good fit with information provided via the query, such as textual information or natural language information provide via the query. The QSR service 58 may return the code snippet(s) to the user via a suitable user interface (e.g., display device).

The user (e.g., a developer) may than use the code snippet(s) in developing quantum service definition files. For instance, the user may reference a quantum code snippet 48 by an instruction 26 which is incorporated at compile time into the quantum source code file 24. The quantum computing device 12 implementing the quantum service 22 and/or a quantum compiler 40 compiling the quantum source code file 24 may identify the QSR instruction 28 in the quantum source code file 24. The quantum computing device 12 may query the QSR 54 (e.g., via QSR service 58) and access the quantum code snippet(s) 48 associated with the QSR instruction 28. The quantum computing device 12 may obtain instructions specified by the quantum code snippet 48.

The quantum computing device 12 may contact the qubit registry 20 and setup the qubits in accordance with standardized instructions associated with the Squantum code snippet(s) 64. The quantum computing device 12 may implement physical manipulations to the qubits 18(0) . . . 18(Q) in accordance with the Squantum code snippet(s) 64 via, for instance, the qubit registry 20. The quantum computing device 12 may associate certain or all of the qubits 18(0) . . . 18(Q) with the quantum service 22. The quantum computing device 12 may return a result to the quantum service 22 indicating that the qubits 18(0) . . . 18(Q) are setup and/or physically configured in accordance with the qubit layer instruction 30.

Figure 2:
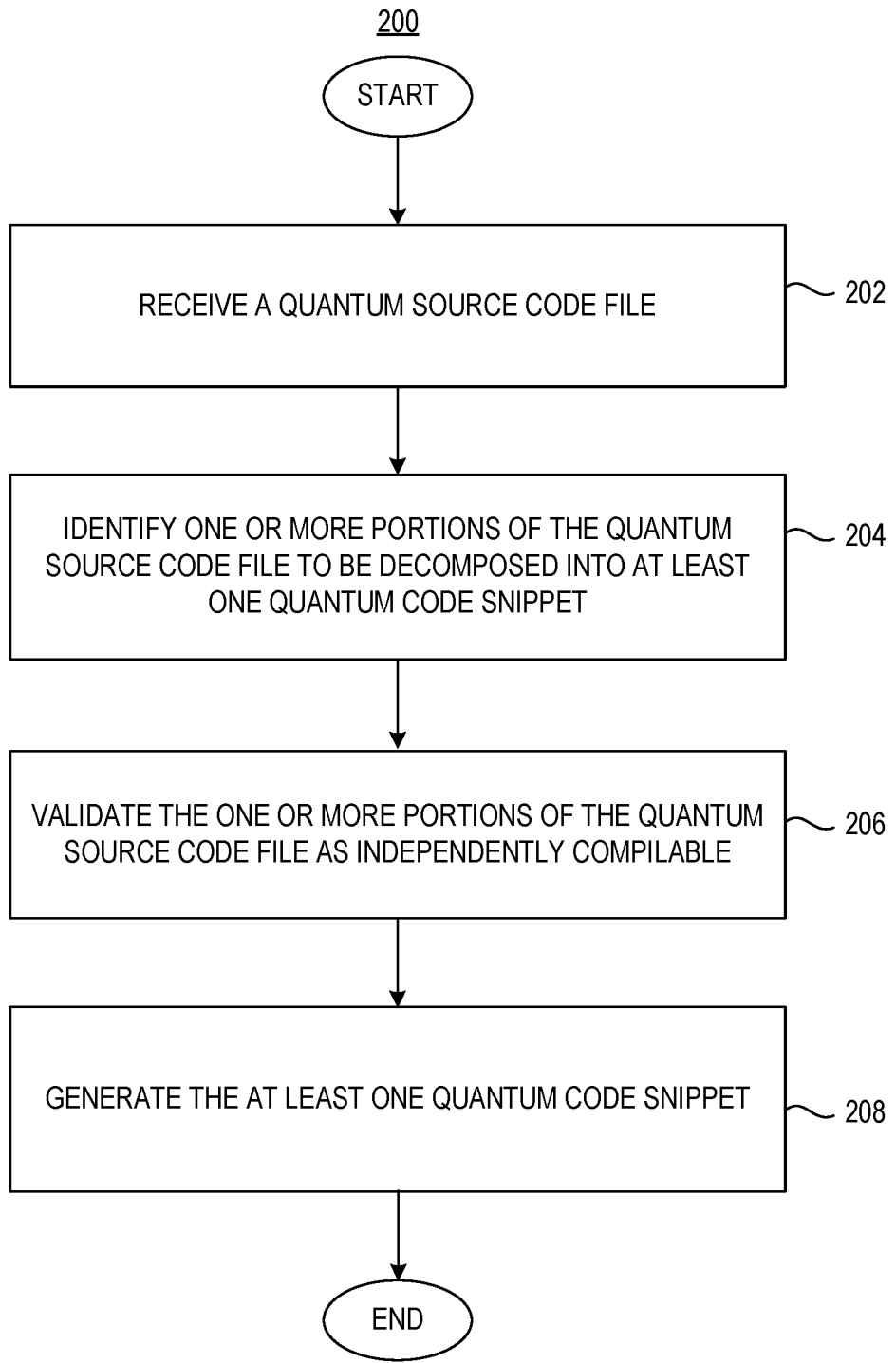
FIG. 2 depicts a flow chart of a method according to examples of the present disclosure.

FIG. 2 is a flow chart of an example method 200 according to example implementations of the present disclosure. FIG. 2 may be implemented using one or more classical and/or quantum computing devices, such as the computing device 32 of FIG. 1. Elements of FIG. 1 are referenced in describing FIG. 2 for the sake of clarity. It is to be understood that, in some examples, some operations illustrated in FIG. 2 may be performed in an order other than illustrated herein, include operations not illustrated, and/or may be omitted.

The method 200 can include, at 202, receiving (e.g., by a computing device comprising a processor device) a quantum source code file. The quantum source code file can describe one or more instructions for implementing a quantum algorithm, such as a quantum service. For instance, the quantum source code file can describe instructions for implementing quantum circuits composed of one or more qubit operations, such as single qubit operations, multiple qubit operations, quantum gate operations, qubit setup operations, measurement operations, and so on. In some implementations, the quantum source code file may include one or more classical instructions. As one example, in some implementations, the quantum source code file may be a quantum assembly code (QASM) file.

The method 200 can include, at 204, identifying (e.g., by the computing device) one or more portions of the quantum source code file to be decomposed into at least one quantum code snippet. The computing device may identify which portions of the quantum source code file may be decomposed into an independently compilable quantum code snippet. As used herein, an "independently compilable" quantum code snippet refers to a portion of the larger quantum source code file that, when passed through a compiler, is capable of being compiled into a valid quantum algorithm. For instance, the independently compilable snippet may be free from syntax errors associated with truncating portions of the quantum source code file that are not included in the snippet, such as missing brackets, unclosed files, incomplete instructions, and so on.

In some cases, a portion of the quantum source code may be noncompilable only due to errors associated with initializations of variables, qubits, etc. used in the portion. For example, if the portion of the quantum source code manipulates three qubits but does not include the code for initializing those qubits, the portion may fail to compile. Nonetheless, the portion could be made independently compilable by adding a preamble to the portion that correctly initializes the variables, qubits, etc. required by the portion.

In some implementations, identifying the one or more portions of the quantum source code file to be decomposed into the at least one quantum code snippet can include receiving (e.g., by the computing system) a request to decompose the quantum source code file. For instance, the request may be provided by a developer as part of a request for debugging, a request for uploading the snippet to a database, as part of a routine code synchronization process, and/or for any other suitable reasons. The request can identify the one or more portions of the quantum source code file. For instance, the request may include a start instruction and/or an end instruction corresponding to the portion of the quantum source code file. As another example, the request may include a line of code such as a breakpoint.

The method 200 can include, at 206, validating (e.g., by the computing device) the one or more portions of the quantum source code file as independently compilable. For instance, a compiler and/or a snippet validation service can validate that the portions of the quantum source code will compile and, in some embodiments, add a preamble to the portions to facilitate compiling. In some implementations, validating the one or more portions of the quantum source code file as independently compilable can include providing (e.g., by the computing system, a portion of the quantum source code file of the one or more portions as input to a quantum compiler. The quantum compiler can produce a compiled quantum algorithm (e.g., an executable algorithm) in response to receiving the quantum source code file. In addition and/or alternatively, the quantum compiler can produce errors in the event that a quantum source code file does not compile correctly. The errors may generally be descriptive of where and/or what type of problem exists in the quantum source code file.

Validating the portions can include determining (e.g., by the computing system) an outcome of a compiling operation of the portion performed by the quantum compiler. For instance, the outcome may be a successful outcome in which no errors are produced and a compiled quantum algorithm is produced, or an unsuccessful outcome in which one or more errors are produced and no compiled quantum algorithm is produced. For instance, the computer system may determine that the outcome is a successful outcome and, in response to determining that the outcome is a successful outcome, validate the portion of the quantum source code file as independently compilable. Alternatively, the computer system may determine that the outcome is an unsuccessful outcome having one or more errors.

In the event of an unsuccessful outcome, the computer system may modify the portion of the quantum source code file based at least in part on the one or more errors. For instance, if the one or more errors relate to missing initialization instructions (e.g., if the portion does not begin at line 1 of the quantum source code file), the computer system may add a preamble with initialization instructions. For instance, in some implementations, modifying the portion of the quantum source code file includes determining a preamble for the portion of the quantum source code file and including the preamble in the portion of the quantum source code file. The preamble may include, for example, class or function definitions, qubit initialization and/or configuration instructions, prior code, and so on.

Additionally and/or alternatively, in some implementations, modifying the portion of the quantum source code file can include modifying at least one of a start instruction of the portion of the quantum source code file or an end instruction of the portion of the quantum source code file. In some cases, for instance, the computing device (e.g., a compiler) may select the portion of the quantum source code file to be decomposed to be close to, but not necessarily identical to, suggested start and end points provided by a user, programmer, external program, etc. For example, a programmer may request to compile a snippet from lines 1 to 5 of a quantum source code file. When the compiler attempts to compile lines 1 to 5, the compiler may return an error due to some underlying issue with the portion from lines 1 to 5. For example, the portion may be missing a closing bracket that occurs on line 6. The computing device may then select the portion of the quantum source code file to instead be lines 1 to 6, such that the portion compiles into a quantum code snippet properly.

The method 200 can include, at 208, generating (e.g. by the computing device) the at least one quantum code snippet. For instance, the computing device can create a new quantum source code file including (e.g., limited to) the quantum code snippet. As an example, the quantum code snippet may be a QASM file. The quantum code snippet may include a subset of the instructions of the original quantum code source file and/or one or more instructions corresponding to the preamble, if added.

In some implementations, the computing device can provide the at least one quantum code snippet to a quantum snippet repository accessible by one or more additional computing devices. The quantum snippet repository can be, for example, the QSR 54 of FIG. 1.

In some implementations, the quantum code snippet can be incorporated into a quantum source code file when it is hosted by the quantum snippet repository. For instance, a quantum source code file can reference the quantum code snippet by command, by identifier, etc. As one example, the quantum source code file may have an instruction such as INCLUDE <snippet>. The computing system can modify the quantum source code file to replace the at least one quantum code snippet in place of one or more instructions of the quantum source code file corresponding to the at least one quantum code snippet. For instance, the INCLUDE command could be replaced by the quantum code snippet at compile time and/or at runtime.

Figure 3:
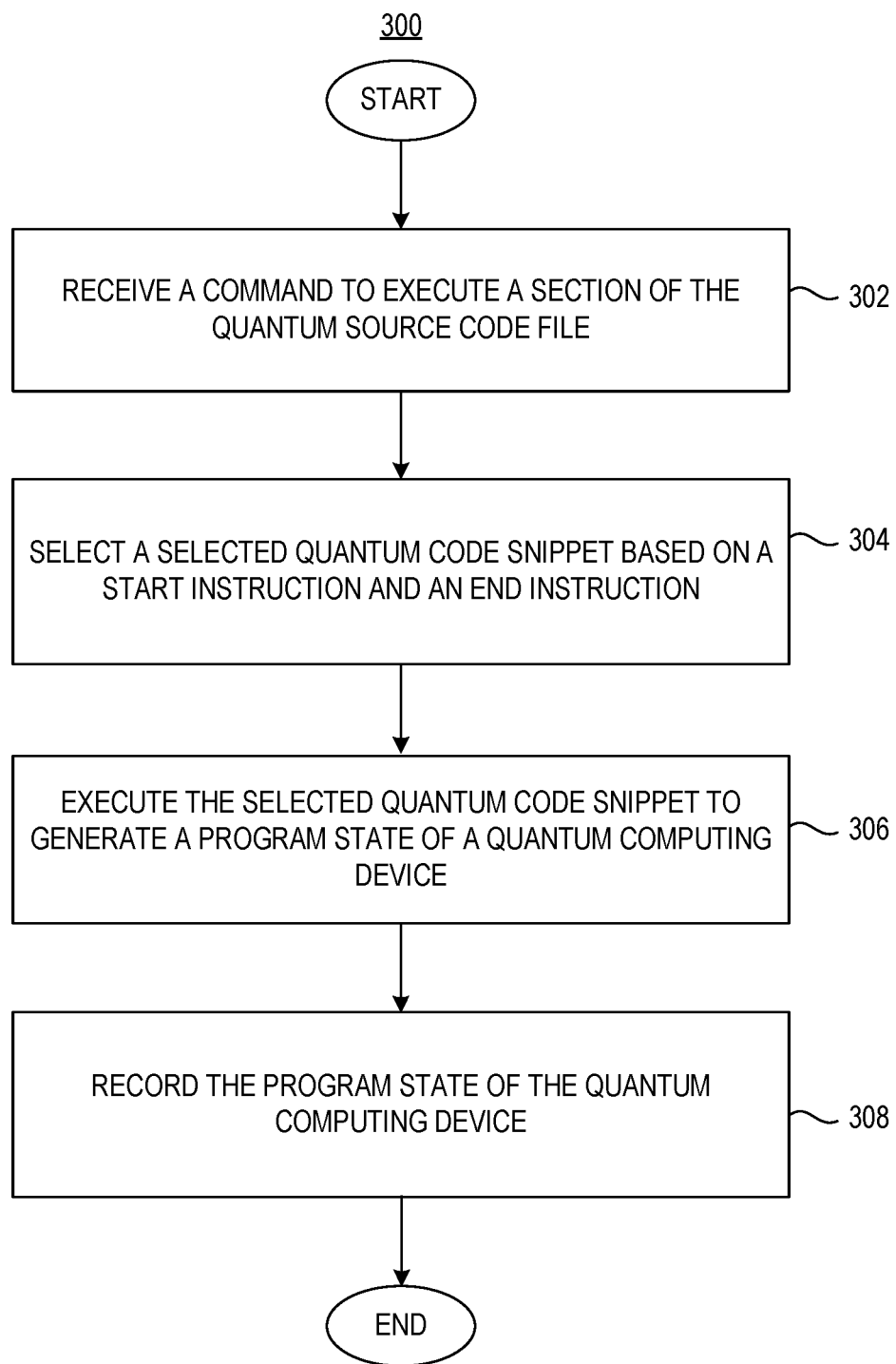
FIG. 3 depicts a flow chart of a method according to examples of the present disclosure.

FIG. 3 is a flow chart of an example method 300 according to example implementations of the present disclosure. FIG. 3 may be implemented using one or more classical and/or quantum computing devices, such as the computing device 32 of FIG. 1. Elements of FIG. 1 are referenced in describing FIG. 3 for the sake of clarity. It is to be understood that, in some examples, some operations illustrated in FIG. 3 may be performed in an order other than illustrated herein, include operations not illustrated, and/or may be omitted.

The method 300 can include, at 302, receiving (e.g., by a computing device) a command to execute a section of the quantum source code file. The section of the quantum source code file can include a start instruction and an end instruction. The start instruction and the end instruction may be, for example, provided by a user, such as a programmer. The programmer may provide the start instruction and end instruction as part of a debugging process, such as through a debugging tool. For instance, the programmer may request to determine a program state at line N. The start instruction may be an instruction at line 1, and the end instruction may be the instruction at line N.

The method 300 can include, at 304, selecting (e.g., by the computing device) a selected quantum code snippet based on the start instruction and the end instruction of the section of the quantum source code file. For instance, the computing device may select a quantum code snippet with the same start instruction and end instruction as the in the request. The computing device may also select a quantum code snippet with a closest matching start and/or end instruction. For instance, if the programmer selects line 8 as a breakpoint but the nearest snippet ends at line 9, the computing device may select the snippet ending at line 9.

The method 300 can include, at 306, executing, by a quantum computing device, the selected quantum code snippet to generate a program state of the quantum computing device subsequent to executing the selected quantum code snippet. For instance, the quantum computing device (e.g., quantum computing device 12 of FIG. 1) can perform the instructions specified by the quantum code snippet. The quantum computing device can then measure the values, states, etc. of qubits and/or other hardware of the quantum computing device to capture the program state. The method 300 can then include, at 308, recording the program state of the quantum computing device. For instance, the program state may be stored and/or provided to the developer, such as by an appropriate user interface.

Figure 4:
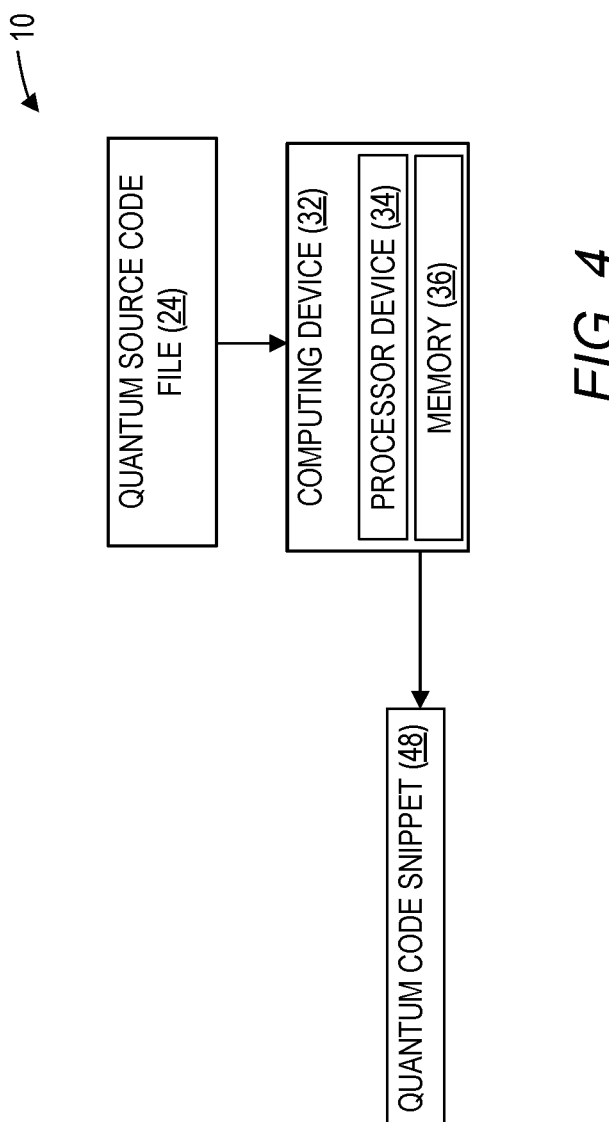
FIG. 4 depicts a system according to examples of the present disclosure.

FIG. 4 illustrates a system 10 including a computing device 32. The computing device 32 includes a memory 36. The computing device 32 includes a processor device 34 coupled to the memory 36. The processor device 34 is to receive a quantum source code file 24. The processor device 34 is to identify one or more portions of the quantum source code file 24 to be decomposed into at least one quantum code snippet 48. The processor device 34 is to validate the one or more portions of the quantum source code file 24 as independently compilable. The processor device 34 is to generate the at least one quantum code snippet 48.

Figure 5:
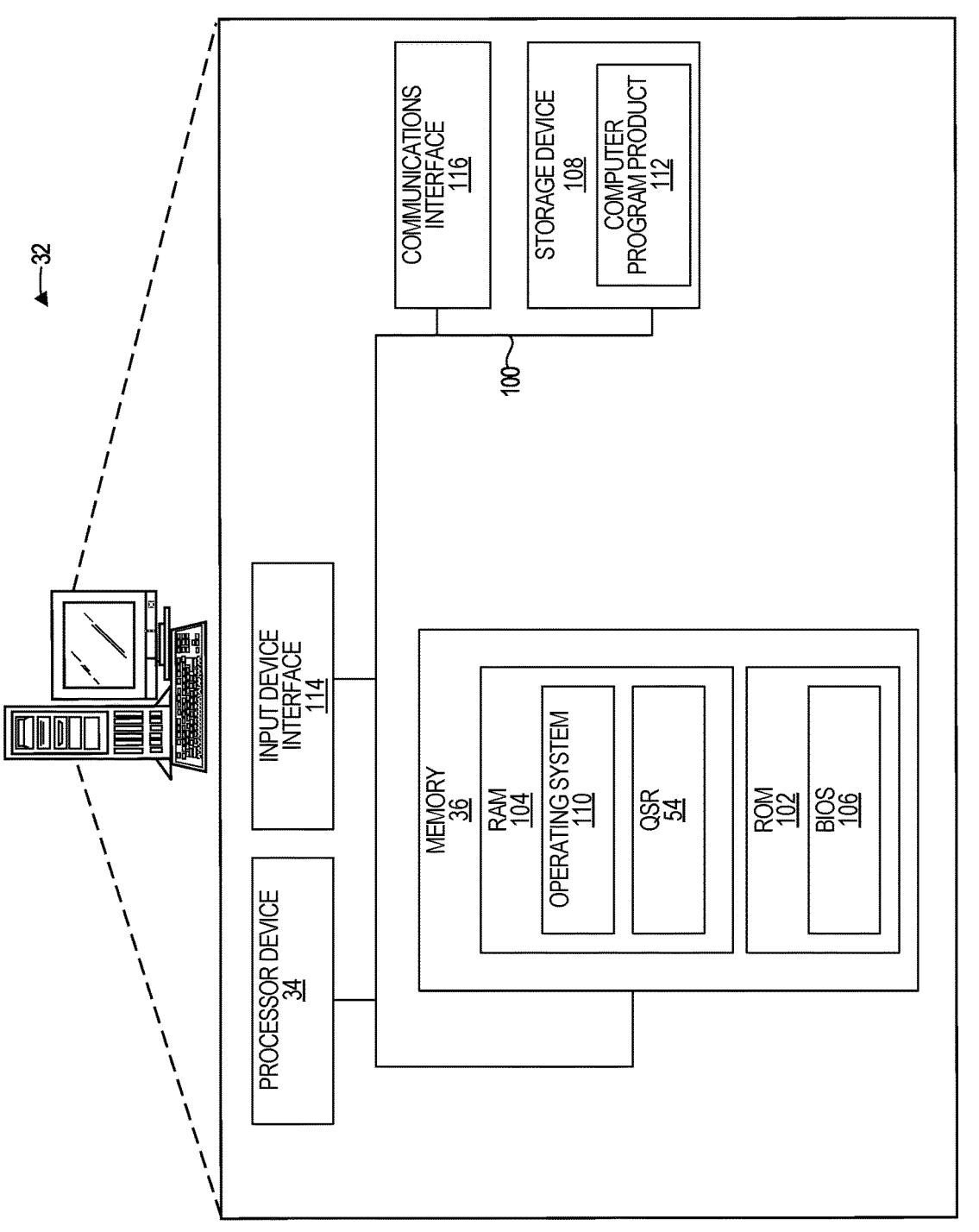
FIG. 5 depicts an example computing device to implement examples according to the present disclosure.

FIG. 5 is a block diagram of the computing device 32 suitable for implementing examples. FIG. 5 is representative of computing device 32 for purposes of illustration. The computing device 32 may comprise any computing or electronic device capable of including firmware, hardware, and/or executing software instructions to implement the functionality described herein, such as a computer server, a desktop computing device, a laptop computing device, or the like. The computing device 32 includes the processor device 34, the memory 36, and a system bus 100. The system bus 100 provides an interface for system components including, but not limited to, the memory 36 and the processor device 34. The processor device 34 may be any commercially available or proprietary processor.

The memory 36 may include non-volatile memory 102 (e.g., read-only memory (ROM), erasable programmable read-only memory (EPROM), electrically erasable programmable read-only memory (EEPROM), etc.), and volatile memory 104 (e.g., random-access memory (RAM)). A basic input/output system (BIOS) 106 may be stored in the non-volatile memory 102 and may include the basic routines that help to transfer information between elements within the computing device 32. The volatile memory 104 may also include a high-speed RAM, such as static RAM, for caching data.

The computing device 32 may further include or be coupled to a non-transitory computer-readable storage medium such as the storage device 108, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 108 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules may be stored in the storage device 108 and in the volatile memory 104, including an operating system 110 and one or more program modules, such as the QSR 54, which may implement the functionality described herein in whole or in part.

All or a portion of the examples may be implemented as a computer program product 112 stored on a transitory or non-transitory computer-usable or computer-readable storage medium, such as the storage device 108, which includes complex programming instructions, such as complex computer-readable program code, to cause the processor device 34 to carry out the steps described herein. Thus, the computer-readable program code may comprise software instructions for implementing the functionality of the examples described herein when executed on the processor device 34. The processor device 34, in conjunction with the QSR 54 in the volatile memory 104, may serve as a controller, or control system, for the computing device 32 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 34 through an input device interface 114 that is coupled to the system bus 100 but may be connected by other interfaces such as a parallel port, an Institute of Electrical and Electronic Engineers (IEEE) 1394 serial port, a Universal Serial Bus (USB) port, an IR interface, and the like.

The computing device 32 may also include a communications interface 116 suitable for communicating with a network or other devices as appropriate or desired.

Figure 6:
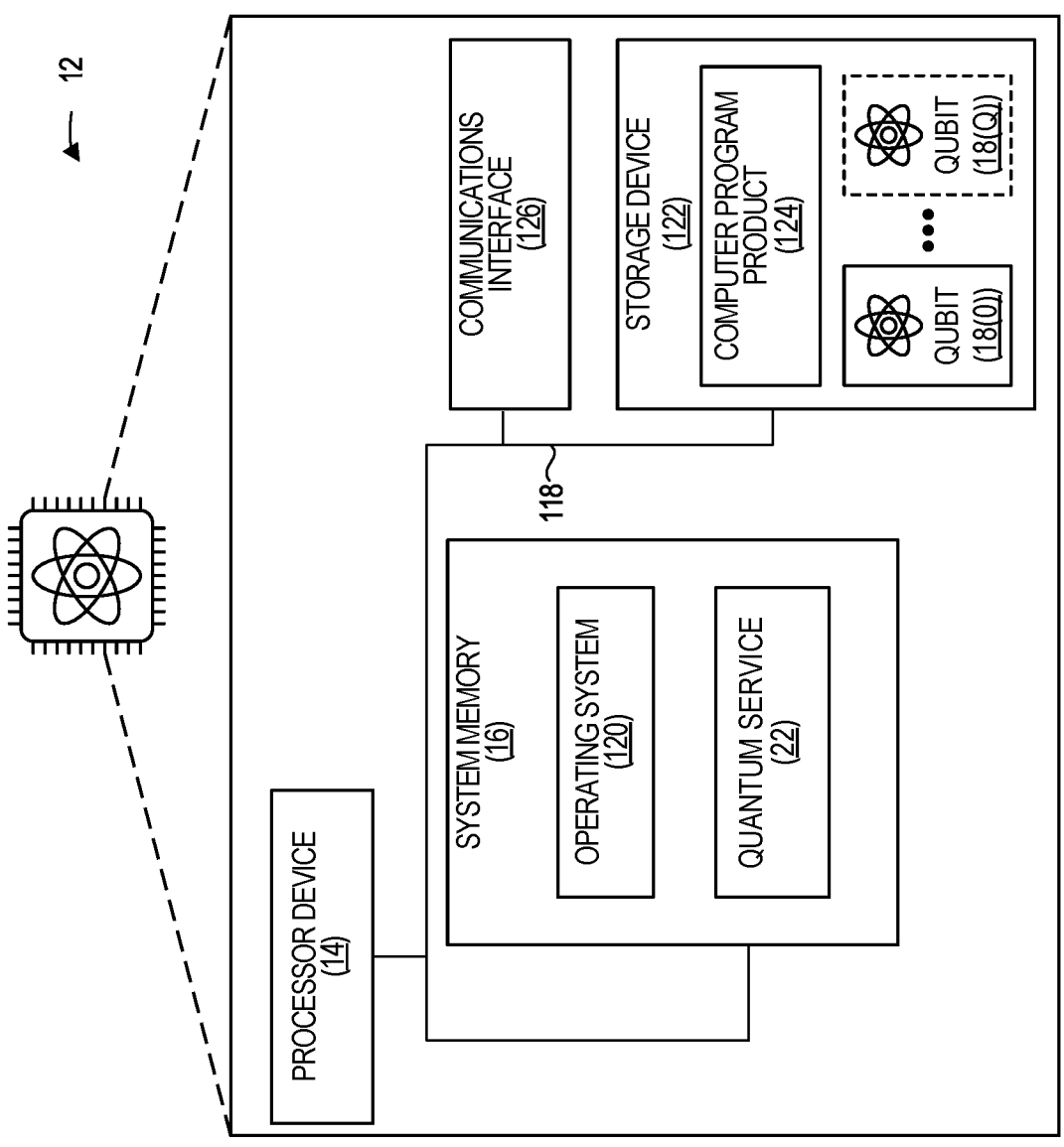
FIG. 6 depicts an example quantum computing device to implement examples according to the present disclosure.

FIG. 6 is a block diagram of a quantum computing device 12 suitable for implementing examples according to example implementations. The quantum computing device 12 may comprise any computing or electronic device capable of including firmware, hardware, and/or executing software instructions to implement the functionality described herein in a quantum environment. The quantum computing device 12 includes one or more quantum processor device(s) 14, one or more memory device(s) 16 and a system bus 118. The system bus 118 provides an interface for system components including, but not limited to, the one or more memory device(s) 16 and the one or more quantum processor device(s) 14. The one or more quantum processor device(s) 14 may be any commercially available or proprietary classical and/or quantum processor suitable for operating in a quantum environment (e.g., using one or more qubits). The one or more memory device(s) 16 may store computer-readable instructions associated with an operating system 120 and/or a quantum service 22.

The quantum computing device 12 may further include or be coupled to a non-transitory computer-readable storage medium such as a storage device 122. The storage device 122 and other drives associated with computer-readable media and computer-usable media may provide non-volatile storage of data, data structures, computer-executable instructions, and the like. The storage device 122 may also store one or more qubits 18(0) . . . 18(Q), which may be measured and/or manipulated by the one or more quantum processor device(s) 14 when performing quantum computing operations.

All or a portion of the examples may be implemented as a computer program product 124 stored on a transitory or non-transitory computer-usable or computer-readable storage medium, such as the storage device 122, which includes complex programming instructions, such as complex computer-readable program code, to cause the one or more quantum processor devices 14 to carry out the functionality described herein. Thus, the computer-readable program code may comprise software instructions for implementing the functionality of the examples described herein when executed on the one or more quantum processor devices 14.

An operator may also be able to enter one or more configuration commands through a keyboard (not illustrated), a pointing device such as a mouse (not illustrated), or a touch-sensitive surface (not illustrated). The quantum computing device 12 may also include a communications interface 126 suitable for communicating with other computing devices, including, in some implementations, classical computing devices and/or quantum computing devices.

Individuals will recognize improvements and modifications to the preferred examples of the disclosure. All such improvements and modifications are considered within the scope of the concepts disclosed herein and the claims that follow.

What is claimed is:

1. A method comprising:

receiving, by a computing system comprising a computing device, the computing device comprising a processor device, a quantum source code file;

identifying, by the computing device, one or more portions of the quantum source code file to be decomposed into at least one quantum code snippet;

validating, by the computing device, the one or more portions of the quantum source code file as independently compilable; generating, by the computing device, the at least one quantum code snippet;

storing, by the computing device, the at least one quantum code snippet to a quantum snippet repository in association with metadata identifying the at least one quantum code snippet to the computing device and one or more additional computing devices, the quantum snippet repository accessible to the one or more additional computing devices;

responsive to a query, identifying, by a quantum comput-
ing device of the computing system, the at least one
quantum code snippet in the quantum snippet reposi-
tory based on the metadata; and implementing, by the quantum computing device, a
manipulation to a qubit in accordance with the at least
one quantum code snippet.

2. The method of claim 1, wherein validating, by the
computing device, the one or more portions of the quantum
source code file as independently compilable comprises:

providing, by the computing device, a portion of the
quantum source code file of the one or more portions as
input to a quantum compiler;

determining, by the computing device, an outcome of a
compiling operation of the portion performed by the
quantum compiler;

determining, by the computing device, that the outcome is
a successful outcome; and in response to determining that the outcome is a success-
ful outcome, validating the portion of the quantum
source code file as independently compilable.

3. The method of claim 2, wherein validating the one or
more portions of the quantum source code file as indepen-
dently compilable further comprises:

determining, by the computing device, that the outcome is
an unsuccessful outcome having one or more errors;
and modifying the portion of the quantum source code file
based at least in part on the one or more errors.

4. The method of claim 3, wherein modifying the portion
of the quantum source code file comprises:

determining a preamble for the portion of the quantum
source code file; and including the preamble in the portion of the quantum
source code file.

5. The method of claim 4, wherein modifying the portion
of the quantum source code file comprises modifying at least
one of a start instruction of the portion of the quantum
source code file or an end instruction of the portion of the
quantum source code file.

6. The method of claim 1, wherein identifying, by the
computing device, the one or more portions of the quantum
source code file to be decomposed into the at least one
quantum code snippet comprises receiving, by the comput-
ing device, a request to decompose the quantum source code
file, the request identifying the one or more portions of the
quantum source code file.

7. The method of claim 1, wherein the quantum source
code file comprises a QASM file.

8. The method of claim 1, wherein the method further
comprises transmitting the at least one quantum code snippet
to the quantum snippet repository accessible by the one or
more additional computing devices.

9. The method of claim 1, further comprising modifying
the quantum source code file to replace the at least one
quantum code snippet in place of one or more instructions of
the quantum source code file corresponding to the at least
one quantum code snippet.

10. The method of claim 1, further comprising:

receiving, by the computing device, a command to
execute a section of the quantum source code file, the
section of the quantum source code file comprising a
start instruction and an end instruction;

selecting, by the computing device, a selected quantum
code snippet based on the start instruction and the end
instruction of the section of the quantum source code
file;

executing, by the quantum computing device, the selected
quantum code snippet to generate a program state of the
quantum computing device subsequent to executing the
selected quantum code snippet; and recording, by the computing device, the program state of
the quantum computing device.

11. A quantum computing device, comprising:

a memory; and a quantum processor device coupled to the memory;

wherein the quantum processor device is to:

receive a quantum source code file;

identify one or more portions of the quantum source code
file to be decomposed into at least one quantum code
snippet;

validate the one or more portions of the quantum source
code file as independently compilable;

generate the at least one quantum code snippet;

store the at least one quantum code snippet to a quantum
snippet repository accessible to one or more additional
computing devices in association with metadata iden-
tifying the at least one quantum code snippet to the
computing device and one or more additional comput-
ing devices, the quantum snippet repository accessible
to the one or more additional computing devices;

responsive to a query, identify the at least one quantum
code snippet in the quantum snippet repository based
on the metadata; and implement a manipulation to a qubit of the quantum
processor device in accordance with the at least one
quantum code snippet.

12. The quantum computing device of claim 11, wherein,
to validate the one or more portions of the quantum source
code file as independently compilable, the quantum proces-
sor device is further to:

provide a portion of the quantum source code file of the
one or more portions as input to a quantum compiler;

determine an outcome of a compiling operation of the
portion performed by the quantum compiler;

determine that the outcome is a successful outcome; and in response to determining that the outcome is a success-
ful outcome, validate the portion of the quantum source
code file as an independently compilable layer.

13. The quantum computing device of claim 12, wherein,
to validate the one or more portions of the quantum source
code file as independently compilable, the quantum proces-
sor device is further to:

determine that the outcome is an unsuccessful outcome
having one or more errors; and modify the portion of the quantum source code file based
at least in part on the one or more errors.

14. The quantum computing device of claim 13, wherein,
to modify the portion of the quantum source code file, the
quantum processor device is further to:

determine a preamble for the portion of the quantum
source code file; and include the preamble in the portion of the quantum source
code file.

15. The quantum computing device of claim 11, wherein
the quantum processor device is further to:

receive a command to execute a section of the quantum
source code file, the section of the quantum source code
file comprising a start instruction and an end instruc-
tion;

select a selected quantum code snippet based on the start
instruction and the end instruction of the section of the
quantum source code file;

execute the selected quantum code snippet to generate a program state of the quantum computing device subsequent to executing the selected quantum code snippet; and record the program state of the quantum computing device.

16. A non-transitory computer-readable storage medium comprising instructions to cause one or more processor devices to:

receive a quantum source code file;

identify one or more portions of the quantum source code file to be decomposed into at least one quantum code snippet;

validate the one or more portions of the quantum source code file as independently compilable;

generate the at least one quantum code snippet;

store the at least one quantum code snippet to a quantum snippet repository accessible to one or more additional computing devices in association with metadata identifying the at least one quantum code snippet to the computing device and one or more additional computing devices, the quantum snippet repository accessible to the one or more additional computing devices;

responsive to a query, identify the at least one quantum code snippet in the quantum snippet repository based on the metadata; and cause a manipulation to a qubit in accordance with the at least one quantum code snippet.

17. The non-transitory computer-readable storage medium of claim 16, wherein, to validate the one or more portions of the quantum source code file as independently compilable, the instructions further cause the one or more processor devices to:

provide a portion of the quantum source code file of the one or more portions as input to a quantum compiler;

determine an outcome of a compiling operation of the portion performed by the quantum compiler;

determine that the outcome is a successful outcome; and in response to determining that the outcome is a successful outcome, validate the portion of the quantum source code file as an independently compilable layer.

18. The non-transitory computer-readable storage medium of claim 17, wherein, to validate the one or more portions of the quantum source code file as independently compilable, the instructions further cause the one or more processor devices to:

determine that the outcome is an unsuccessful outcome having one or more errors; and modify the portion of the quantum source code file based at least in part on the one or more errors.

19. The non-transitory computer-readable storage medium of claim 18, wherein, to modify the portion of the quantum source code file, the instructions further cause the one or more processor devices to:

determine a preamble for the portion of the quantum source code file; and include the preamble in the portion of the quantum source code file.

20. The non-transitory computer-readable storage medium of claim 16, wherein the instructions further cause the one or more processor devices to:

receive a command to execute a section of the quantum source code file, the section of the quantum source code file comprising a start instruction and an end instruction;

select a selected quantum code snippet based on the start instruction and the end instruction of the section of the quantum source code file;

execute the selected quantum code snippet to generate a program state of a quantum computing device subsequent to executing the selected quantum code snippet; and record the program state of the quantum computing device.

* * * * *